(12) United States Patent
Mamnani

(10) Patent No.: US 7,450,567 B1
(45) Date of Patent: Nov. 11, 2008

(54) WEB-BASED PERSONAL ASSISTANT

(75) Inventor: Praveen K. Mamnani, Westminster, CO (US)

(73) Assignee: Avaya Inc., Basking Ridge, NJ (US)

(*) Notice: Subject to any disclaimer, the term of this patent is extended or adjusted under 35 U.S.C. 154(b) by 874 days.

(21) Appl. No.: 10/658,821

(22) Filed: Sep. 8, 2003

(51) Int. Cl.
*H04L 12/64* (2006.01)

(52) U.S. Cl. ........................ 370/352; 370/356

(58) Field of Classification Search ............ 370/352, 370/356
See application file for complete search history.

(56) References Cited

U.S. PATENT DOCUMENTS

| | | | |
|---|---|---|---|
| 5,960,406 A * | 9/1999 | Rasansky et al. | 705/9 |
| 6,683,870 B1 * | 1/2004 | Archer | 370/356 |
| 7,127,400 B2 * | 10/2006 | Koch | 704/270.1 |
| 7,203,297 B2 * | 4/2007 | Vitikainen et al. | 379/207.02 |
| 2006/0230137 A1 * | 10/2006 | Gare et al. | 709/224 |
| 2007/0036294 A1 * | 2/2007 | Chaudhuri et al. | 379/88.16 |
| 2007/0047522 A1 * | 3/2007 | Jefferson et al. | 370/352 |

FOREIGN PATENT DOCUMENTS

EP 0903679 A2 * 3/1999

OTHER PUBLICATIONS

Hotsip, 'Mobile Presence Bringing you closer', XP-002227729, Jun. 2001, pp. 1-5.*
Avaya, Inc. "Advanced Speech Access," available at http://www.avaya.com/ac/common/index.jhtml?location=M1H1005G1007F2033P3086N4612, downloaded Jul. 14, 2003.
Winther, Mark et al., "Speech Interfaces Drive Mobile Responsiveness," IDC Executive Brief, pp. 1-7, Mar. 2002.

* cited by examiner

*Primary Examiner*—Melvin Marcelo
(74) *Attorney, Agent, or Firm*—Sheridan Ross P.C.

(57) ABSTRACT

A system for contacting a first user using a packet-switched communication is provided that includes:
(a) a network server 176 operable to receive, by means of a packet switched network, a request from a second user for graphical information associated with the first user; and
(b) a resource manager 184 operable (i) to provide the second user with the graphical information, wherein the graphical information comprises one or more fields for receiving an inputted text message for the first user and a plurality of communication options for transmission of the inputted text message to the first user, the plurality of communication options being a plurality of an email, a facsimile, a voice mail, an instant message, a pager, and a telephone call and (ii), when the second user selects one or more of the plurality of communication options, provide the text message to the first user by means of the selected one or more communication options.

45 Claims, 5 Drawing Sheets

WEB-BASED PERSONAL ASSISTANT

FIELD OF THE INVENTION

The present invention relates to a system for contacting another in a network, and more particularly to a system for providing information for a network user to other users of the network.

BACKGROUND OF THE INVENTION

The increased reliance on electronic messaging, such as voice mail, email, instant messaging, text messaging, and numeric pages, among others, has resulted in a great increase in the number of electronic messages a user sends and receives daily. Many of these messages are commonly requests for information, or requests for initiating a meeting between the sending and receiving parties. Hence, a major problem is that a user can become inundated with messages, many of which may be handled with relative ease by a simple response returning the desired information or confirming presence at a meeting. However, time spent managing such messages adversely impacts the productivity of businesses and adds to the already high stress levels of employees in the business environment. Accordingly, it would be beneficial to have a method and system which helps reduce the amount of incoming messages to a user.

In enterprise communication networks, integrated messaging systems that combine voice mail and e-mail functions in an integrated application are available. Generally, such systems, such as the Avaya™ Unified Communications Center, allow a user to access their various mailboxes through a single device, such as a telephone or a personal computer. In connection with such devices, the ability to pass messages to and from voice mail mailboxes and data files using packet data transmission techniques has been developed. For example, data can be transferred to and from voice mail mailboxes over conventional computer networks. Such systems commonly contain a directory of all users, which can be used to select a user to contact by, for example, telephone or email. The directory of users generally has a listing of all users, from which a particular user may be selected to access additional information about that particular user. While such a system provides a useful tool for communications in an enterprise, information provided therein remains static, and generally is limited to contact information. Accordingly, such a directory does little to provide specific information regarding particular users, and help reduce the number of electronic messages received by a user.

In other Web applications, Web users (Party A or the caller) can visit another user's (Party B or the called party) home page, but they do not know the whereabouts of the called party. The caller is typically limited to seeing static/dynamic (non-realtime) Web content published by the called party. Portal players, such as Yahoo, do provide a way to personalize syndicated content (such as stocks, weather, news, etc.) and limited collaboration (such as email and chat) for a portal. Portal players, however, do not provide an automated personalized assistant.

Although automated personal assistants are known, they are speech-based personal assistants and are limited to circuit-switched networks, such as the Public Switched Telephone Network. For example, the Avaya Advanced Speech Access Application™ provides a speech-based personal assistant that allows a subscriber using speech commands remotely to access and manage electronic or voice mail messages, to make phone calls or set up and conduct conference calls, to manage to do lists and calendar functions, and to configure sophisticated contact notification and forwarding features for contacts by pre-selected people. Speech-based personal assistants, however, are not suitable for packet-switched networks and are therefore generally limited in versatility and functionality.

SUMMARY OF THE INVENTION

These and other needs are addressed by the various embodiments and configurations of the present invention. The invention is directed generally to the use of a packet-switched network server to provide a virtual assistant or "e-assistant" to assist contactors in communicating with a user/subscriber associated with the virtual assistant. The virtual assistant can provide real time information to the contactor regarding the presence and availability of the user/subscriber.

The virtual assistant is typically Web-based and allows the contacting party to obtain personalized graphical information for the associated contacted party. The virtual assistant is commonly accessed by visiting the contacted party's Web page. The virtual assistant can provide various extendable capabilities to the contacting party via one or more Web pages. Such capabilities include the ability to send messages to multiple endpoints (e.g., email server, voice mail server, fax server, instant message server, pager server, telephone call, and Personal Digital Assistant or PDA, provide general and personalized greetings, provide "find me" functionality, provide real time or current presence and availability information, set up weblinks to topics, and provide the ability to contact subject matter expertise or desired skill such as in a call center, and set up meetings electronically.

A Web-based virtual assistant can provide more capability and flexibility than a speech-based assistantbythenature of Web applications versus speech applications. Speech applications, such as the Advanced Speech Access Application™, can have fewer capabilities compared to a Web-based virtual agent because Web applications can provide more real estate space and an easier way to browse than speech applications. The target end users for speech applications are mobile telephony users whereas the target users for the Web applications are desktop and remote users having access to the Web.

These and other advantages will be apparent from the disclosure of the invention(s) contained herein.

The above-described embodiments and configurations and advantages are neither complete nor exhaustive. As will be appreciated, other embodiments of the invention are possible utilizing, alone or in combination, one or more of the features set forth above or described in detail below.

DETAILED DESCRIPTION

Operating Environment

Figure 1:
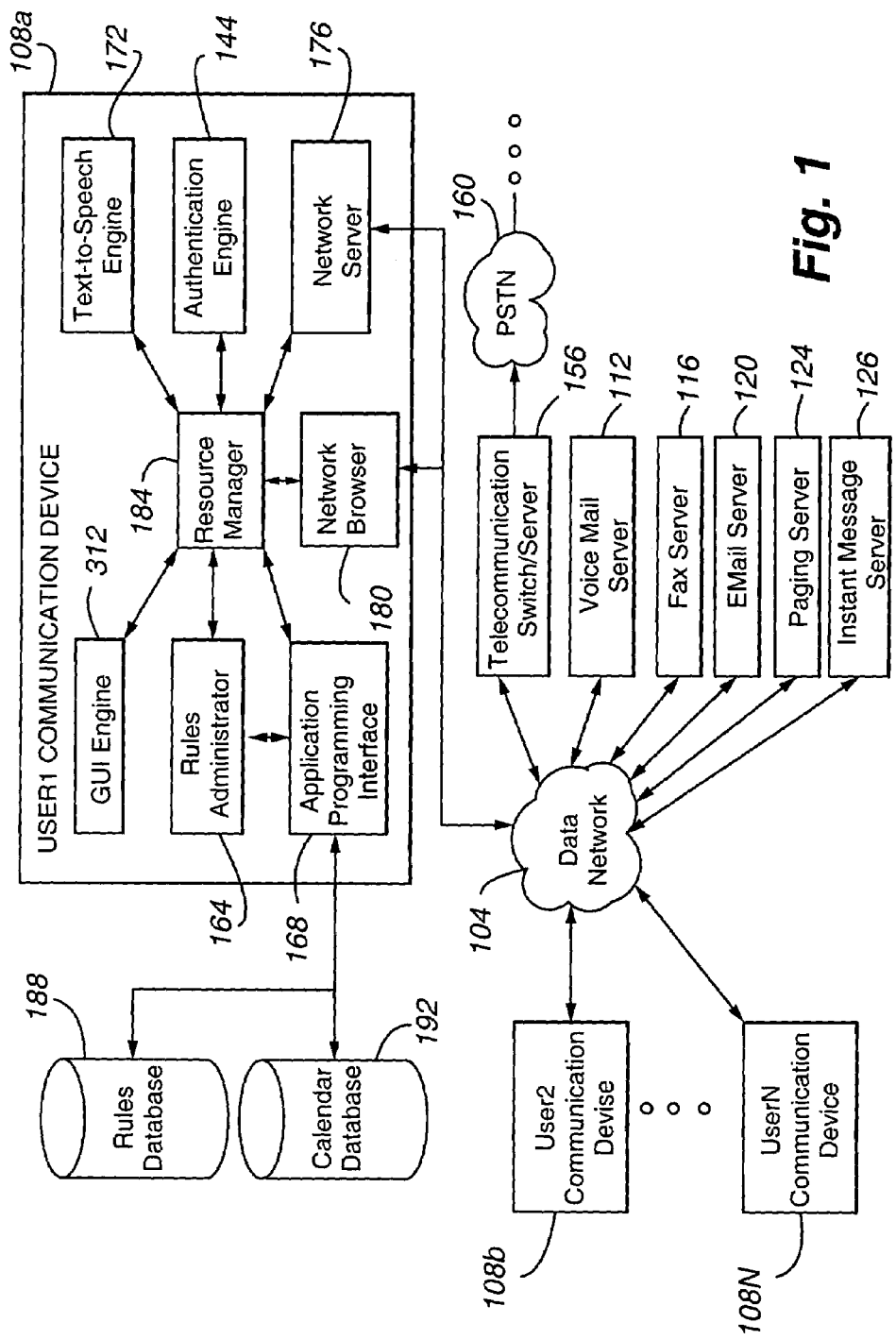
FIG. 1 is a block diagram illustration of a system of one embodiment of the present invention.

FIG. 1 illustrates an environment in which one embodiment of the present invention operates.

Multiple computational devices 108a-n, associated with multiple users, are connected to a data network 104 and to rules and calendar databases 188 and 192, respectively. The data network is further connected to a telecommunication switch/server 156, such as a Private Branch Exchange, which is in communication with the Public Switched Telephone Network 160, a voice mail server 112, a fax server 116, an email server 120, a paging server 124, and instant messaging server 126.

The data network 104 can be any appropriate packet-switched distributed processing network, whether a LAN, MAN, WAN, etc. In one embodiment, the data network 104 is the Internet. The communication devices 108a-n typically packet-switched and collectively are part of an enterprise network.

The telecommunication switch/server 156, voice mail server 112, fax server 116, email server 120, paging server 124, and instant messaging server 126 are conventional. By way of example, the email server 120 can be an email application such as UNIX mail, Groupwise™ by Correl, and/or Microsoft Exchange™ by Microsoft Corporation and can include a local (central) message store operable to store email messages and a message notification agent operable to notify a user client that an email or other message intended for the user has been received by the server The rules and calendar databases 188, 192 contain personal contact information relating to the first user. The rules database 188 contains presence and availability and graphical information for the first user and user configurable rules, such as the first user's preferences regarding what external user is entitled to what presence and availability information, what presence and availability information is to be provided at specified times during the day, what presence and availability information is to be provided when the first user is engaged in specific activities, and rules governing what actions are taken based on the user of the group trying to contact the callee. "Presence and availability information" generally refers to data or metadata that identifies and/or is otherwise associated with one or more of availability information, location information, user/subscriber profile information, or user-defined attributes related to a tracked address of the user/subscriber and/or the address associated identity. Examples of presence and availability information include the current location of a user (e.g., at home, at office, contactable via wireless telephone, etc.), the current activities of the user (e.g., attending a meeting, engaged in another communication, inputting information on a key board, etc.), and profile information includes information about or associated with the user (e.g., occupation, skills, financial information, name, address, etc.) The graphical information includes the layout and various fields of a graphical display, such as a Web page, which is typically configured by the first user. Finally, the user's preferences refer to the informational entitlements of various entities attempting to access the foregoing information and/or permissible modes of contacting the first user (e.g., via desk telephone, wireless telephone, home telephone, pager, etc.). For example, potential contactors, such as the second user, may be grouped into entitlement classes, such that contactors in a first class are entitled to receive the personal contact information of the first user without limitation, contactors in a second class are entitled to receive only specified items of the first user's personal contact information, and contactors in a third class (or users not included in either the first or second classes) are entitled to receive only a narrow subset of the first users' personal contact information. The calendar database 192 includes personal scheduling information of the first user. For example, the calendar database 192 could be an Microsoft™ Outlook™ calendar that includes, by day, scheduled meetings/conference calls of the first user, working hours, and the like.

The information is preferably contained in the databases, or other type of file system useful for storing information in an easily retrievable format. The databases, in one embodiment, includes both long term storage, such as a magnetic media, as well as shorter term storage which may include RAM and other cache type memories.

The communication devices 108a-n are typically software-controlled devices, such as a Personal Computer or PC, laptop, Personal Digital Assistant or PDA, and the like that each comprise a number of operational components, namely a graphical user interface (GUI) engine 132, a rules administrator 164, an application programming interface 168, a resource manager 184, a network browser 180, a text-to-speech engine 172, an authentication engine 144, and a network server 176.

The GUI engine is operable to generate a graphical user interface for users accessing the network server 176.

The rules administrator 164 and application programming interface 168 are operable to administer/configure the rules database 188 and calendar database 192 and retrieve requested information. In an example of information retrieval, the rules administrator for a contactor or second user retrieves, via the application programming interface 168, the corresponding rule(s) governing what personal contact information is to be provided to the user and retrieves the personal contact information set forth in the rule(s).

The text-to-speech engine 172 is operable to convert text or other video data into audio data. For example, the engine 172 is able to convert a text message into speech by known techniques. The engine 172 maintains a library of text words and a corresponding audio representation of each text word. As the words are recognized, the corresponding audio representation is retrieved. The assembled audio stream is then forwarded to a suitable component such as the voice mail server 112 (as part of a voice mail session) or PBX 156 (as part of a telephone call to the first user). Stated another way, the audio representation of the text message could either be left as a voice mail message for the first user in the voice mail server 112 or be provided to the first user in a telephone call.

The authentication engine 144 is operable to authenticate external users, such as the second user. The authentication engine 144 performs the authentication functions 144 by known techniques to allow users accessing the device 108 to authenticate their identity and access information contained in the device 108 which may have restricted access.

The network server 176 and network browser 180, respectively, are operable to provide information to a user via the data network or retrieve information from a user via the data network.

The resource manager 184 is operable to manage each of the GUI engine 132, rules administrator 164, text-to-speech engine 172, authentication engine 144, network server 176, and network browser 180 by issuing commands, requests, and acknowledgments and providing the output of the GUI engine 132, rules administrator 164, text-to-speech engine 172 and authentication engine 144 to the appropriate entities, such as the network browser of another user. To permit the resource manager 184 to provide an audio message to the first user, via voice mail server 112 or telephone, a Computer Telephony Interface or CTI (not shown) may be provided between the resource manager 184 and the voice mail server 112 or telecommunications switch/server 156. As will be appreciated, the Session Initiation Protocol, if employed, would permit a session to be initiated between the communication device and the switch/server 156 or voice mail server 112 to deliver the message to the first user.

As noted, the device 108 may also include an interface to a computer telephony interface (CTI) link, which is interconnected to the switch/server 156, the voice mail server 112, and the public switched telephone network (PSTN) 160. The interface to the CTI link 152 allows the device 108 to place outbound calls to the PSTN 160, and to receive inbound calls from the PSTN 160.

The device 108 may be configured as an application server and/or a browser, such as a stand-alone server and/or browser, or may be incorporated into another computer component such as a PBX.

The devices 108 can each include a local message store (not shown) containing one or more queues of notification (or partial text e-mail) messages from the message notification agent, a data store (not shown) for archiving full text e-mail messages, and an email program module (not shown) for interfacing with the email server application. The various user computer systems may also include CTI links and softphone applications, allowing users to place and receive telephone calls through the computer.

Operation of the Communication Device

Figure 2A:
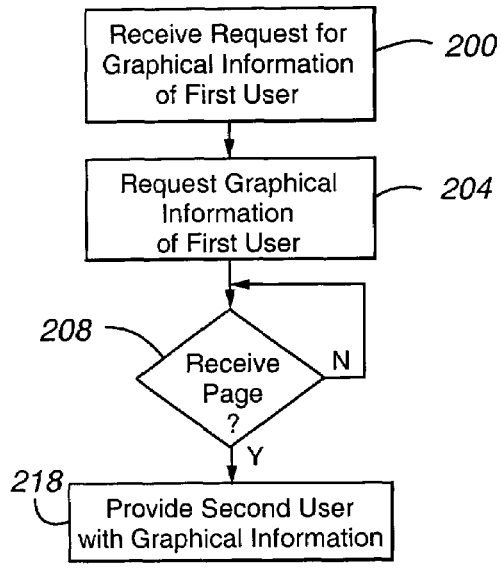
FIG. 2A is a flow chart diagram illustrating an embodiment of the operational steps of the network server in retrieving a first user's graphical information.
Figure 2B:
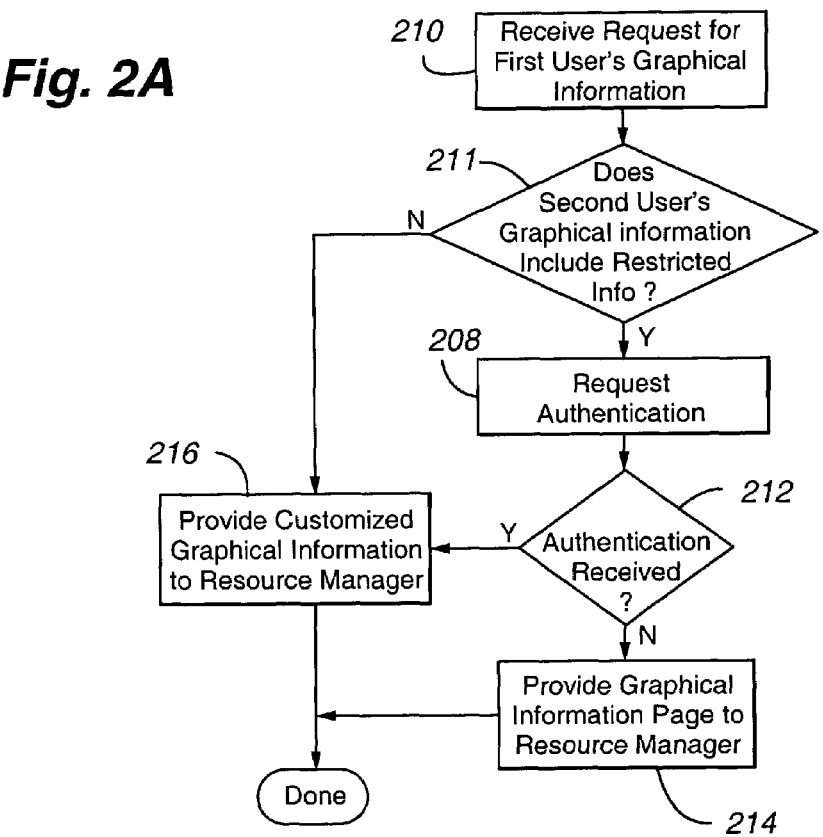
FIG. 2B is a flow chart diagram illustrating an embodiment of the operational steps of the resource manager for accessing information related to a user.
Figure 2C:
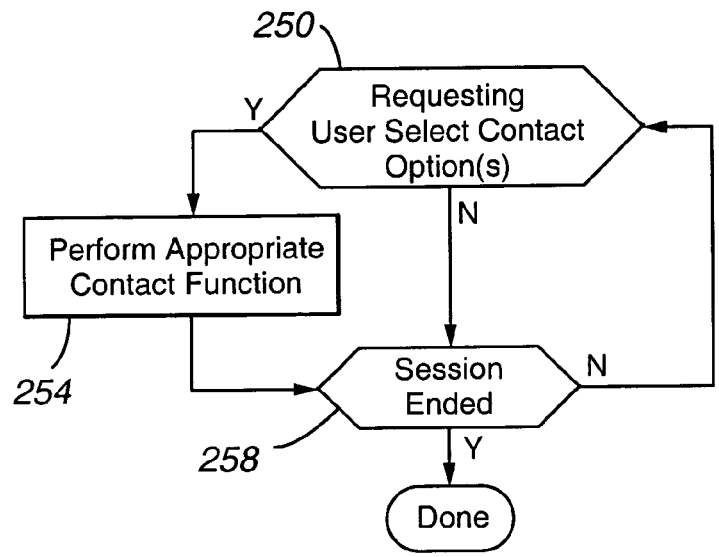
FIG. 2C is a flow chart diagram illustrating an embodiment of the operational steps of the resource manager for effecting a selected contact option.
Figure 3:
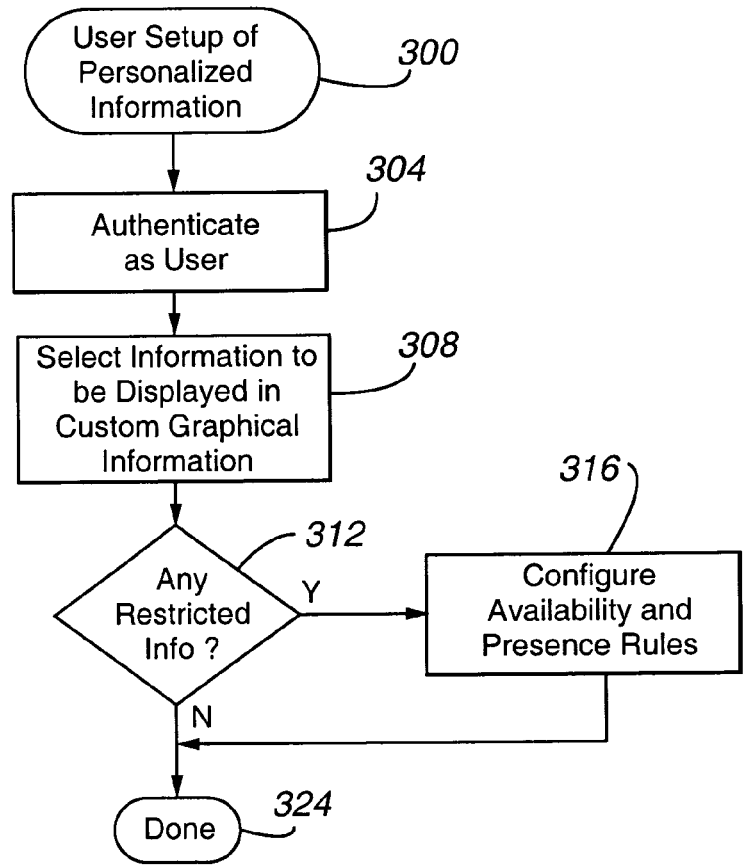
FIG. 3 is a flow chart diagram illustrating the operational steps for providing information available to other users for an embodiment of the present invention.

Referring now to FIGS. 2-3, the operation of the communication device, for an embodiment of the present invention, is described. The device 108 in one embodiment is operable to provide graphics based information regarding a particular user of the system. Other users may access this graphics based information, through the resource manager, and obtain relevant information related to the user, such as how to contact the user and specific information regarding the user's schedule and resources available to the user. Furthermore, users may be required to authenticate their identity in order to access information. The device 108 is also operable to place calls through a CTI link, in response to input received through the resource manager.

Referring now to FIG. 2A, the operation of the application server when a second user wishes to access information related to a first user is now described. Initially, as noted by step 200, the second user requests access to the first user's information. The request for access is made through the network browser in the communication device 108 of the second or external user to the network server in the device 108 of the first user. The request may come from the selection of the second user from a directory located on a LAN associated with the enterprise network, such as an employee directory. In an exemplary embodiment, the request is addressed to a Universal Resource Locator ("URL") or other type of Universal Resource Indicator ("URI") associated with the first user's communication device 108. Typically, the URL is the address of the network server 176 in the first user's device 108. An example of a URL of the first user is "http://WWW.hector-.com/xtension__538__1902_personal_assistant.html" in which hector is the name of the first user and 538-1902 is the first user's telephone number.

In step 204, the request is redirected to the resource manager 184, which directs a request for the first user's graphical information (e.g., Web page) to the rules administrator 164. The request typically includes information identifying the requesting user, such as the name of the user, the address of the requesting user's communication device 108, and the like.

In decision diamond 206, the resource manager 184 determines when a successful response is received from the rules administrator 164.

Referring now to FIG. 2B, in step 210, the rules administrator 164 receives the request and forwards the request to the application programming interface 168, which causes the requested rules associated with the first user and, if appropriate, the second user to be retrieved.

In step 211, the rules administrator determines, based on the retrieved rules, whether or not the graphical information to be provided to the second or requesting user requires successful authentication. This may be the case, for example, where the graphical information includes restricted information. Restricted information may include, for example, information such as personal telephone numbers which the first user does not wish to make available to any second or contacting user who accesses their information, or sensitive information which is only to be accessed by authorized contacting users, such as proprietary information. If authentication is required, the rules administrator requests the resource manager to authenticate the requesting user in step 208. The authentication engine may then request additional information, such as a password, and then authenticate the contacting user. In one embodiment, the resource manager recognizes that the request for information is originating at the contacting user's access terminal, and automatically authenticates the contacting user. Such an operation may be performed, for example, using cookies associated with the contacting user's Web browser.

In step 212, the rules administrator 164 determines, based on a response from the resource manager, whether or not the requesting user was successfully authenticated. When the requesting user is successfully authenticated or when authentication is not required in decision diamond 211, the rules administrator 212 provides customized graphical information populated with appropriate personal contact information to the resource manager. When authentication is not successful, the resource manager in step 214 provides default graphical information to the resource manager.

Returning now to FIG. 2A, the resource manager in step 218 provides the requesting user with the pertinent graphical information via the network server.

Figure 4:
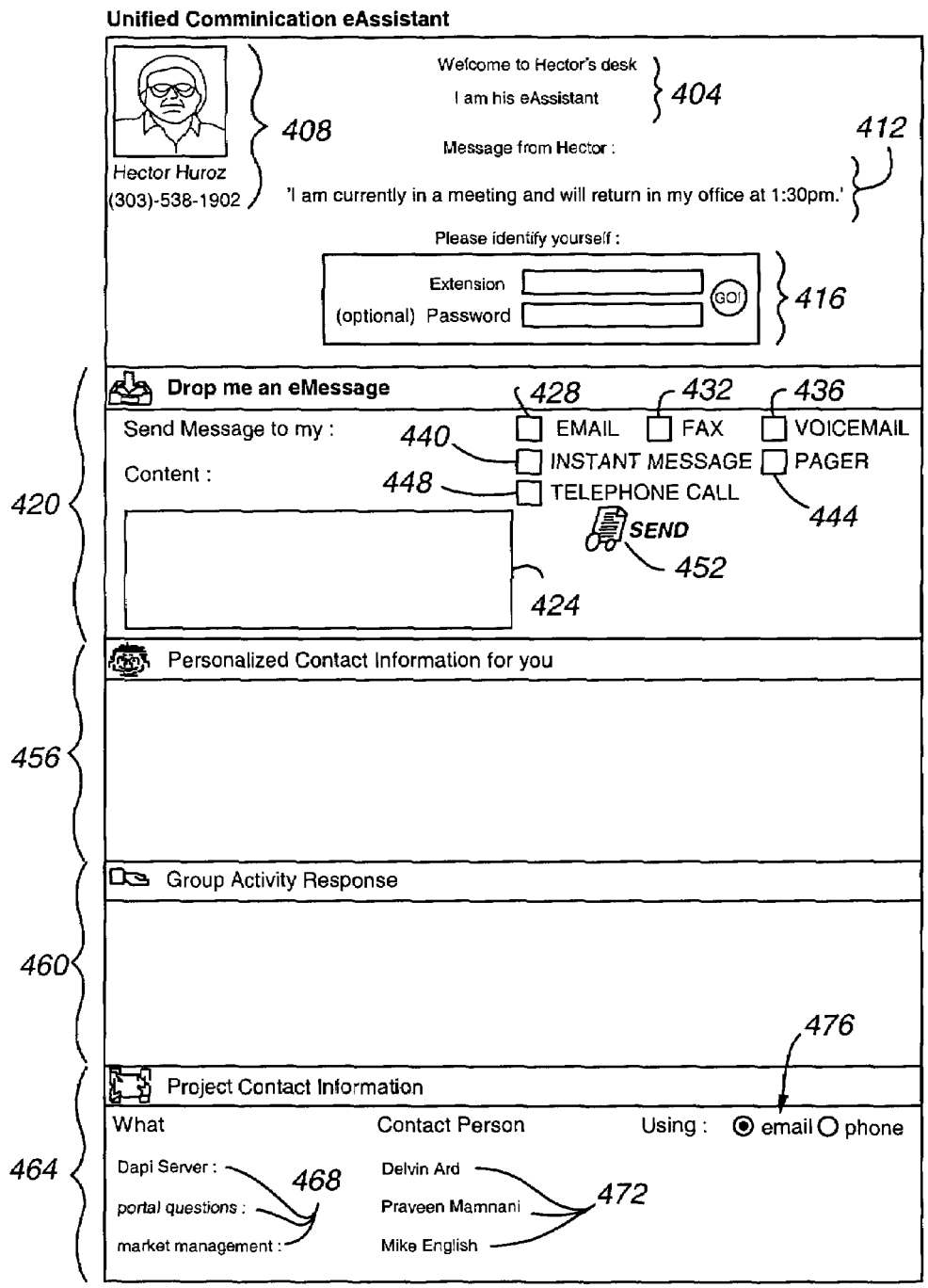
FIG. 4 is a screen image illustrating a graphic information display for a user for one embodiment of the present invention.
Figure 5:
FIG. 5 is a screen image illustrating a graphic information display including personalized content for an authenticated calling party.

Referring now to FIGS. 4 and 5, the customized and default graphical information will be discussed. FIG. 4 depicts the default graphical information while FIG. 5 depicts the customized graphical information.

Referring to FIG. 4, the default graphical information 400 comprises a personal greeting 404, a picture of and contact information associated with the first user 408, a message 412 from the first user indicating his current presence and availability (e.g., the first user's schedule for a particular day or week, information related to scheduling a meeting with the second user, etc.), a personal identification block 416 including the requesting user's telephone number/extension (or other identification information such as name, relationship to first user, and the like) and password (optional), and a messaging block 420 including a block 424 for inputting a message to the first user, a number of message transmission options, namely email 428, fax 432, voice mail 436, instant message 440, pager 444, and telephone call 448, along with a "send" icon 452 which, when clicked on, causes transmission of the message by the selected medium/media. As will be appreciated, more than one medium may be selected by the requesting user. Additional blocks include a personalized contact information block 456 (which is blank), a group activity response block 460 (which is also blank), and a project contact information block 464 which includes the respective skills 468 of a number of contact persons 472 (i.e., Dapi server for Delvin Ard, portal questions for Praveen Mamnani, and market management for Mike English) and contact options 476 (which are shown as being email and phone) for a selected contact person. When a contact option is selected and double clicked on, the type of selected contact is initiated.

Referring now to FIG. 5, the customized graphical information 500 will be discussed. The information includes the same fields as in FIG. 4 with a number of added fields in various blocks. For example, in block 456 a personalized message 504 is displayed from the first user to the requesting user, a find me option is presented in field 508 which may be activated by clicking on icon 512. Upon clicking on the icon, the resource manager can locate the first user in one or more of the following ways: page, instant message to a communication device of the first user (e.g., Personal Digital Assistant, cellular phone, PC, laptop, etc.), (wired or wireless) telephone call (one or both of circuit switched or packet switched (e.g., Voice Over IP)), email, fax, voice mail, and the like. The first user can, of course, specify different contact options for different classes of users. In block 460, various group activities are displayed in fields 516 and 520. The group activities involve groups in which both the first user and the requesting user are involved. For each activity, corresponding response fields 524 and 528 are provided to indicate whether the requesting user can attend and, when a "no" is checked, the requesting user is asked to enter an alternate date in a corresponding field 532. When the fields are completed, they may be submitted to the resource manager by clicking on the submit icon 536. The resource manager can then provide the information to the first user by selected contact media, such as e-mail, instant message, and voice mail.

As will be appreciated, the information in the displayed page may vary by contacting user-by-user or contacting user group-by-user group depending on the first user's configurable rules. By way of example, the information in the default and customized pages can be varied contacting user-by-user or by defined contacting user groups. The information presented can even be inaccurate or misleading at the election of the user.

The various icons 452, 512, 536, and 476 can be configured as hypertext links which the GUI engine 132 receives (via the network server) and forwards to the resource manager 184 for appropriate processing. For example, if the "find me" icon 512 is selected, the GUI engine receives the request via the network server and forwards this request to the resource manager which causes the appropriate contacts to be initiated.

In an alternative embodiment, the default graphical information or page 400 is displayed to all requesting users with the block 416 only being presented to requesting users that may obtain additional information by successfully authenticating themselves to the first user's resource manager. As shown in FIG. 5, when the block is completed and the go icon 540 clicked, the resource manager can populate the blocks 456 and 460 when the entered information successfully matches the information for the requesting user contained in the rules database.

In yet another alternative embodiment, block 416 is populated by the resource manager when the customized graphical information is presented to the requesting user.

Turning to FIG. 2C, the resource manager waits in decision diamond 250 for the requesting user to select one or more contact options in the displayed page of FIG. 4 or 5.

When the requesting user selects one or more contact options and the selection is received by the resource manager via the network server, the resource manager effects the appropriate contact option using the text of the message inputted into block 424. As noted above, when the requesting user selects a voice mail or telephone call, the resource manager provides the inputted text to the text-to-speech engine 172 which provides an equivalent audio stream for forwarding to the first user by means of the selected contact medium. In another example, upon reception of a properly formatted text message request the network server generates a file conforming to the SMTP protocol, and forwards this file to the email server associated with the network. As will be appreciated, the Internet uses a message standard, known as a Simple Mail Transfer Protocol (SMTP), which works in conjunction with a user's email program and defines the control messages used by two computers to exchange email messages.

After effecting the selected contact option or when no contact option is selected within a defined period of time, the resource manager in decision diamond 258 determines whether the requesting user has ended the session. If so, the resource manager terminates the algorithm in step 262. If not, the resource manager returns to step 250 to await an initial or further contact option to be received from the requesting user with the same or a different inputted text message.

Although no flowchart is provided, a similar flowchart to FIG. 2C is used for processing a request by the requesting user to locate the first user (block 456), to provide an email to the first user indicating whether or not the requesting user can attend a selected activity and, if not, an alternate date for the activity (block 460), and to effect a contact between the requesting user and a selected contact person (block 464).

Referring now to FIG. 3, the selection and set up of the personalized information is described in more detail. Initially, as noted by block 300, the first user enters the setup of personalized information. The first user, at block 304, authenticates with the application server, to verify that the proper user is accessing and selecting information for display. At block 308, the first user selects information to be displayed in the default and/or customized graphic display. This information may include the information shown in FIGS. 4 and 5 and any additional information of potential interest to a requesting user, such as, for example, office telephone extension, mobile and/or home telephone numbers, email contact information, instant messaging contact information, pager contact information, instant messaging identifier, or IM ID.

In one embodiment, the application server provides a template which the user may fill in to provide information. Such a template may include selections regarding whether the information is generally available, or is restricted. At block 312, it is determined if any of the information entered by the user has been selected as restricted information. If some information is selected as restricted, the user, at block 316, configures the availability and presence rules. The rules, for example, set forth the contacting users who are allowed to access restricted information, what restricted information can be accessed, and the level of access and information which may be accessed for each contacting user (or group of users). The rules may also include any personalized greetings for specific contacting users or a specific group of contacting users. Such personalized greetings may include any information for the selected contacting users. For example, if the user setting up the personalized greeting has knowledge that a second user requires some specific information, this information may be included in the personal greeting. If no information is restricted or after the rules are configured, the operation is complete, as noted by block 324, and the information is stored in the rules database.

In an alternative embodiment, the graphical information can be configured to include an address and/or telephone number of the contacting user for a return contact of the first user telephone call. When the first user selects the address and/or telephone number, a return contact can be initiated automatically by the resource manager.

The fields included in the displays 400 and 500 of FIGS. 4 and 5 are only one example of a number of configurations possible for the display. Other configurations may include, for example, fewer fields than illustrated in FIG. 5, or additional or different fields, such as additional contact information, email contact information, schedule information, and information regarding other individuals in the user's work group.

While the invention is described with reference to an application program that runs on a communication device in conjunction with a data network and in connection with user systems, those skilled in the art will recognize that the invention also may be implemented in combination with other program modules incorporated into other systems. Generally, program modules include routines, operating systems, application programs, components, data structures, etc., that perform particular tasks or implement particular abstract data types.

Those skilled in the art will appreciate that the invention maybe practiced with other computer system configurations, including hand-held devices, multiprocessor systems, microprocessor-based or programmable consumer electronics, minicomputers, mainframe computers, and the like.

The invention may also be practiced in distributed computing environments where tasks are performed by remote processing devices that are linked through a communications network. In a distributed computing environment, program modules can be located in both local and remote memory storage devices. Execution of program modules can occur locally in a stand-alone manner or remotely in a client/server or peer-to-peer manner. Examples of such distributed computing environments include local area networks of an office, enterprise-wide computer networks, and the Internet.

The invention may be practiced with computational components using a variety of operating systems, protocols, and/or network applications. For example, the clients and/or servers generating email can use UNIX mail (which is defined by SMTP), and Eudora (which is defined by Post Office Protocol or POP).

Additionally, the displayed page may contain areas generated by the GUI engine which the first user may select to initiate a direct contact with the second user. Such contact initiation may include, for example, generating a wired or wireless telephone call to the second user at one or more telephone numbers. The contact options may be selected to vary by individual. Thus, if the first user does not wish for a requesting user, for example, to place a telephone call to the first user's mobile telephone, the first user may select information related to their mobile telephone to be omitted from the displayed page.

The architecture of the present invention can be employed in enterprise or nonenterprise networks. For example, the displayed pages can be used by entities ranging from individuals to businesses to provide contactors over the Internet with selected information. In one configuration, the displayed pages are employed in a multimedia contact center environment to provide a versatile interface to customers. External users could be entered into the database by the user or external users can register with the user's default Web page and the user could then configure rules governing how that registered external user is treated. To facilitate registration, a registration could be presented to the external user before the default Web page or an option to register could be included in the default Web page. If selected, the registration page could then be presented to the external user. In a nonenterprise network, the communication device is typically located inside of a firewall with the page being displayed outside of the firewall.

In another configuration, a first user has two separate sets of displayed pages, one for contactors within the enterprise network of which the first user is a part and one for contactors outside of the enterprise network. In that event, separate data stores could be used to hold the sets of graphical information.

In another embodiment, the various modules are embodied as one or more logic circuit(s), software, or a combination thereof.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for contacting a first user using a packet-switched communication, comprising:
   (a) receiving, by a packet switched network, a request from a second user for a web page associated with the first user; and
   (b) providing, by the packet switched network, the second user with the web page, wherein at least one of the following is true:
       (B1) the provided web page comprises at least one of a current physical location of the first user, current contact options for the first user, and a current activity of the first user, wherein the at least one of a current physical location of the first user, current contact options for the first user, and a current activity of the first user is varied depending on the identity of the requestor;

(B2) the provided web page comprises a plurality of contact options to contact the first user and an activatable icon to initiate a contact to the first user by an option selected by the second user, the contact options being a plurality of an email, a facsimile, a voice mail, an instant message, a pager, and a telephone call, wherein the specific contact options provided to requestors are depending on the identity of the requestor;

(B3) the provided web page comprises a personalized message for the second user, the personalized message being provided only to selected requestors but not to all requestors; and (B4) the provided web page comprises one or more fields for receiving a text message from the second user for the first user, wherein the inputted text message is converted automatically into a voice message for the first user at the request of the second user.

2. The method of claim 1, wherein (B1) is true.

3. The method of claim 1, wherein (B2) is true.

4. The method of claim 1, wherein (B3) is true.

5. The method of claim 1, wherein (B4) is true.

6. The method of claim 1, wherein the provided web page comprises a location option to locate a communication device through which the first user is currently directly contactable and wherein, when the location option is selected by the second user, the method further comprises:

initiating a plurality of communications with a plurality of communication devices associated with the first user; and when the first user responds to one or more of the plurality of communications, notifying the second user of the communication device corresponding to the responded to one or more of the plurality of communications.

7. The method of claim 1, wherein the provided web page comprises at least one activity description involving the first and second users, a response indicator indicating whether or not the second user can participate in the at least one activity, and a request for an alternate date acceptable to the second user for the at least one activity description.

8. The method of claim 1, wherein the provided web page comprises a listing of individuals, a corresponding skill of each listed individual, and contact information associated with each of the listed individuals.

9. The method of claim 5, wherein the web page comprises a plurality of communication options for selection by the second user, wherein the communication options comprise at least one of a voice mail and telephone call, wherein, when at least one of voice mail and a telephone call is selected by the second user, the method further comprises:

converting the text message inputted by the second user into a corresponding audio message; and forwarding the corresponding audio message to the first user by the selected at least one of voice mail and a telephone call.

10. The method of claim 1, wherein the providing step comprises:

authenticating the identification of the second user; and applying one or more rules to select a web page configuration to be provided to the second user, the rules requiring differing web page configurations to be provided to differing requestors.

11. The method of claim 1, wherein the provided web page is a personal homepage of the first user.

12. A computer readable medium encoded with processor executable instructions operable to perform the steps of claim 1.

13. A method for contacting a first user using a packet-switched communication, comprising:

receiving, by a packet switched network, a request from a second user for a web page associated with the first user;

providing the second user with the web page, wherein the web page comprises one or more fields for receiving an inputted text message for the first user;

receiving from the second user, by the web page, an inputted text message for the first user;

receiving a command to forward the inputted text message to the first user by a selected communication option, the selected communication option being at least one of a live voice call and voice mail;

converting automatically the inputted text message into a corresponding audio stream; and sending the corresponding audio stream to at least one of a live voice communication device and a voice mail repository associated with the first user.

14. The method of claim 13, wherein the web page comprises a plurality of communication options for transmission of the inputted text message to the first user, the plurality of communication options being a plurality of an email, a facsimile, a voice mail, an instant message, a pager, and a telephone call and further comprising:

when the second user selects one or more of the plurality of communication options, providing the text message to the first user by the selected one or more communication options.

15. The method of claim 14, wherein at least one of the following is true:

(1) the provided web page comprises at least one of a current physical location of the first user, current contact options for the first user, and a current activity of the first user, wherein the at least one of a current physical location of the first user, current contact options for the first user, and a current activity of the first user is varied depending on the identity of the requestor;

(2) the provided web page comprises a plurality of contact options to contact the first user and an activatable icon to initiate a contact to the first user by an option selected by the second user, the contact options being a plurality of an email, a facsimile, a voice mail, an instant message, a pager, and a telephone call, wherein the specific contact options provided to requesters are depending on the identity of the requestor; and (3) the provided web page comprises a personalized message for the second user, the personalized message being provided only to selected requestors but not to all requestors.

16. The method of claim 15, wherein (1) is true.

17. The method of claim 15, wherein (2) is true.

18. The method of claim 15, wherein (3) is true.

19. The method of claim 13, wherein the provided web page comprises a location option to locate a communication device through which the first user is currently directly contactable and wherein, when the location option is selected by the second user, the method further comprises:

initiating a plurality of communications with a plurality of communication devices associated with the first user; and when the first user responds to one or more of the plurality of communications, notifying the second user of the communication device corresponding to the responded to one or more of the plurality of communications.

20. The method of claim 13, wherein the provided web page comprises at least one activity description involving the first and second users, a response indicator indicating whether or not the second user can participate in the at least one activity, and a request for an alternate date acceptable to the second user for the at least one activity description.

21. The method of claim 13, wherein the provided web page comprises a listing of individuals, a corresponding skill of each listed individual, and contact information associated with each of the listed individuals.

22. The method of claim 13, wherein the providing step comprises:
 authenticating the identification of the second user; and
 applying one or more rules to select a web page configuration to be provided to the second user, the rules requiring differing web page configurations to be provided to differing requesters.

23. The method of claim 22, wherein the provided web page is a personal homepage of the first user.

24. A computer readable medium encoded with processor executable instructions operable to perform the steps of claim 13.

25. A system for contacting a first user using a packet-switched communication, comprising:
 (a) a network server operable to receive, by a packet switched network, a request from a second user for a web page of the first user; and
 (b) a resource manager operable to provide, by the packet switched network, the second user with the web page of the first user, wherein at least one of the following is true:
  (B1) the provided web page comprises at least one of a current physical location of the first user, current contact options for the first user, and a current activity of the first user, wherein the at least one of a current physical location of the first user, current contact options for the first user, and a current activity of the first user is varied depending on the identity of the requester;
  (B2) the provided web page comprises a plurality of contact options to contact the first user and an activatable icon to initiate a contact to the first user by an option selected by the second user, the contact options being a plurality of an email, a facsimile, a voice mail, an instant message, a pager, and a telephone call, wherein the specific contact options provided to requestors are depending on the identity of the requestor;
  (B3) the provided web page comprises a personalized message for the second user, the personalized message being provided only to selected requestors but not to all requestors; and
  (B4) the provided web page comprises one or more fields for receiving a text message from the second user for the first user, wherein the inputted text message is converted automatically into a voice message for the first user at the request of the second user.

26. The system of claim 25, wherein (B1) is true.

27. The system of claim 25, wherein (B2) is true.

28. The system of claim 25, wherein (B3) is true.

29. The system of claim 25, wherein (B4) is true.

30. The system of claim 25, wherein the web page comprises a location option to locate a communication device through which the first user is currently directly contactable and wherein, when the location option is selected by the second user, the resource manager is further operable to initiate a plurality of communications with a plurality of communication devices associated with the first user and, when the first user responds to one or more of the plurality of communications, notify the second user of the communication device corresponding to the responded to one or more of the plurality of communications.

31. The system of claim 25, wherein the provided web page comprises at least one activity description involving the first and second users, a response indicator indicating whether or not the second user can participate in the at least one activity, and a request for an alternate date acceptable to the second user for the at least one activity description.

32. The system of claim 25, wherein the provided web page comprises a listing of individuals, a corresponding skill of each listed individual, and contact information associated with each of the listed individuals.

33. The system of claim 29, wherein the web page comprises a plurality of communication options for selection by the second user, wherein the communication options comprise at least one of a voice mail and telephone call, wherein the at least one of voice mail and a telephone call is selected by the second user, and further comprising:
 a text-to-speech engine operable to convert the inputted text message into a corresponding audio message; and
 wherein the resource manager is further operable to forward the corresponding audio message to the first user by the selected at least one of voice mail and a telephone call.

34. The system of claim 25, further comprising:
 an authentication engine operable to authenticate the identification of the second user; and
 a rules administrator operable to apply one or more rules to select a web page configuration to be provided to the second user, the rules requiring differing web page configurations to be provided to differing requestors.

35. A system for contacting a first user using a packet-switched communication, comprising:
 a network server operable to receive, by a packet switched network, a request from a second user for a web page of the first user;
 a resource manager operable (a) receive, by a packet switched network, a request from a second user for the web page associated with the first user; (b) provide the second user with the web page, wherein the web page comprises one or more fields for receiving an inputted text message for the first user; (c) receive from the second user, by the web page, an inputted text message for the first user; (d) receive a command to forward the inputted text message to the first user by a selected communication option, the selected communication option being at least one of a live voice call and voice mail; (e) convert automatically the inputted text message into a corresponding audio stream; and (f) send the corresponding audio stream to at least one of a live voice communication device and a voice mail repository associated with the first user.

36. The system of claim 35, wherein the web page comprises a plurality of communication options for transmission of the inputted text message to the first user, the plurality of communication options being a plurality of an email, a facsimile, a voice mail, an instant message, a pager, and a telephone call and wherein, when the second user selects one or more of the plurality of communication options, the text message is provided to the first user by the selected one or more communication options.

37. The system of claim 35, wherein at least one of the following is true:
 (1) the provided web page comprises at least one of a current physical location of the first user, current contact options for the first user, and a current activity of the first user, wherein the at least one of a current physical location of the first user, current contact options for the first user, and a current activity of the first user is varied depending on the identity of the requestor;

(2) the provided web page comprises a plurality of contact options to contact the first user and an activatable icon to initiate a contact to the first user by an option selected by the second user, the contact options being a plurality of an email, a facsimile, a voice mail, an instant message, a pager, and a telephone call, wherein the specific contact options provided to requestors are depending on the identity of the requestor; and (3) the provided web page comprises a personalized message for the second user, the personalized message being provided only to selected requestors but not to all requesters.

38. The system of claim 37, wherein (1) is true.

39. The system of claim 37, wherein (2) is true.

40. The system of claim 37, wherein (3) is true.

41. The system of claim 37, wherein the provided web page comprises a location option to locate a communication device through which the first user is currently directly contactable, wherein, when the location option is selected by the second user, a plurality of communications are initiated with a plurality of communication devices associated with the first user and, when the first user responds to one or more of the plurality of communications, the second user of the communication device is notified of the responded to one or more of the plurality of communications.

42. The system of claim 37, wherein the provided web page comprises at least one activity description involving the first and second users, a response indicator indicating whether or not the second user can participate in the at least one activity, and a request for an alternate date acceptable to the second user for the at least one activity description.

43. The system of claim 37, wherein the provided web page comprises a listing of individuals, a corresponding skill of each listed individual, and contact information associated with each of the listed individuals.

44. The system of claim 37, wherein the resource manager is further operable to authenticate the identification of the second user and apply one or more rules to select a web page configuration to be provided to the second user, the rules requiring differing web page configurations to be provided to differing requestors.

45. The system of claim 44, wherein the provided web page is a personal homepage of the first user.

\* \* \* \* \*